(12) United States Patent
Nakamura et al.

(10) Patent No.: US 8,714,587 B2
(45) Date of Patent: May 6, 2014

(54) CURTAIN AIRBAG

(75) Inventors: Kenji Nakamura, Tokyo (JP); Sakae Sugimori, Tokyo (JP)

(73) Assignee: Takata Corporation, Tokyo (JP)

( * ) Notice: Subject to any disclaimer, the term of this patent is extended or adjusted under 35 U.S.C. 154(b) by 371 days.

(21) Appl. No.: 13/117,421

(22) Filed: May 27, 2011

(65) Prior Publication Data

US 2011/0291393 A1    Dec. 1, 2011

(30) Foreign Application Priority Data

May 31, 2010   (JP) .................................. 2010-123748

(51) Int. Cl.
*B60R 21/213*   (2011.01)
*B60R 21/232*   (2011.01)
*B60R 21/2338*   (2011.01)

(52) U.S. Cl.
USPC ...................... 280/730.2; 280/743.2; 280/749

(58) Field of Classification Search
USPC ............................. 280/730.2, 742, 743.2, 749
See application file for complete search history.

(56) References Cited

U.S. PATENT DOCUMENTS

| | | | |
|---|---|---|---|
| 7,922,193 B2 | 4/2011 | Breuninger et al. | |
| 8,480,125 B1 * | 7/2013 | Belwafa et al. | 280/730.2 |
| 2005/0206138 A1 | 9/2005 | Breuninger et al. | |
| 2006/0157958 A1 | 7/2006 | Heudorfer et al. | |
| 2010/0276916 A1 * | 11/2010 | Breuninger et al. | 280/730.2 |
| 2011/0291393 A1 * | 12/2011 | Nakamura et al. | 280/730.2 |
| 2012/0286499 A1 * | 11/2012 | Wiik et al. | 280/730.2 |
| 2013/0221646 A1 * | 8/2013 | Abramoski et al. | 280/743.2 |

FOREIGN PATENT DOCUMENTS

| | | |
|---|---|---|
| EP | 1 477 372 A1 | 11/2004 |
| JP | 2000-033845 A | 2/2000 |
| JP | 2001-058556 A | 3/2001 |
| JP | 2006-137413 A | 6/2006 |

OTHER PUBLICATIONS

Extended European Search Report issued in counterpart European Application No. 11 00 4443.5 dated Sep. 6, 2011 (7 pages).

* cited by examiner

*Primary Examiner* — Karen Beck
(74) *Attorney, Agent, or Firm* — Fitch, Even, Tabin & Flannery, LLP

(57) ABSTRACT

The curtain airbag includes: a curtain bag section configured with cloth panels joined in a bag shape, housed prior to use in a folded state in a vehicle roof side edge section and deploying and inflating downwards when injected with deployment gas; a collision detector for detecting a collision and/or signs of an imminent collision of the vehicle; a gas generator for supplying the deployment gas to the curtain bag section in response to a detection result of the collision detector; and a guide member configured with a cloth panel, rolled up from the bottom of the curtain bag section that has been folded prior to use, via the vehicle width direction inside towards the top of the curtain bag section, the guide member being disposed at a position overlapping with the vehicle front-rear direction position of an interior member provided inside the vehicle compartment.

3 Claims, 4 Drawing Sheets

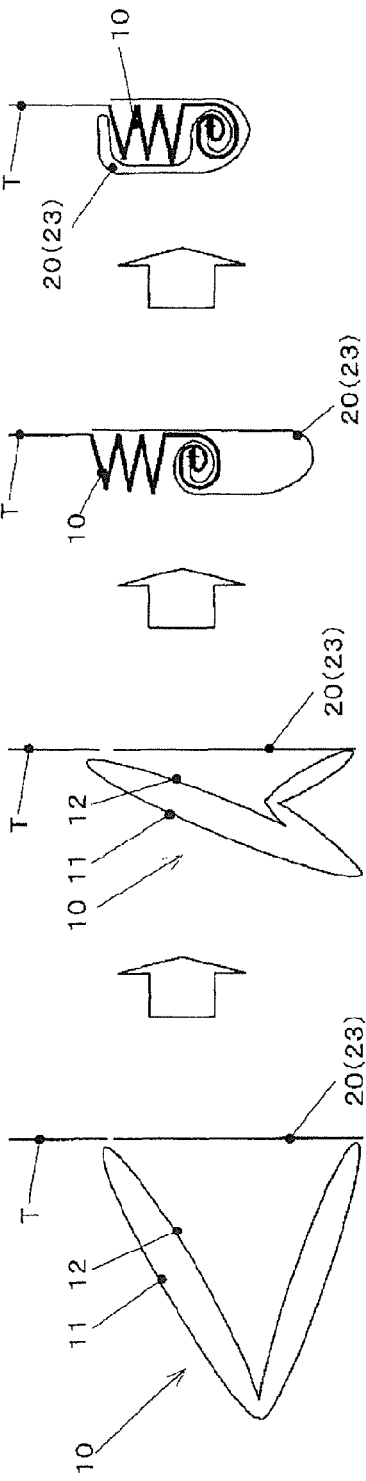

CURTAIN AIRBAG

CROSS-REFERENCE TO RELATED APPLICATION

This application claims priority under 35 U.S.C. §119 to Japanese Patent Application No. JP2010-123748 filed on May 31, 2010, the entire content of which is hereby incorporated herein by reference in its entirety.

BACKGROUND OF THE INVENTION

1. Technical Field

Embodiments described herein relate to a curtain airbag having a curtain bag section for deploying from a section at the side edge of a vehicle roof and inflating along the side wall of the vehicle compartment, and in particular to a curtain airbag for preventing an interior member interfering with deployment and inflation.

2. Related Art

An airbag device such as one provided to a car retains and protects an occupant by a bag section deploying and inflating by being injected with deployment gas, when there is a collision. As an example of such a type of airbag device, a curtain airbag is known having a curtain bag section that deploys downwards in a curtain shape along a side window from a section at the side edge of the roof of a vehicle.

In related technology pertaining to such a curtain airbag, for example, JP-A-2006-137413 describes increasing the bag stroke of a curtain bag section used for impact absorption without excessively increasing the volume within the bag. In this curtain airbag, a tension panel, functioning as a tether, is provided spanning along the top-bottom direction at the vehicle width direction outside of the curtain bag section. The tension panel retains the bag body in a bent or curved shape so as to form a projection facing towards the vehicle compartment inside, such that the curtain bag section adopts a D-shape in cross-section when viewed along the front-rear direction.

With such a curtain airbag, there is a need to prevent correct deployment and inflation from being impeded, for example by the curtain bag section catching on an interior member, such as trim provided to a section of pillar, an above door grab handle or a seat belt (shoulder belt) anchor, partway through deployment.

A proposal has been made to form a springboard shaped guide member from metal, for example, at the top edge of a problematic interior member, to bounce the airbag towards the vehicle compartment inside during deployment. However, such a proposal results in a significant increase in number of components, weight and cost of a vehicle. Since such a guide member is also manufactured separately to the curtain bag section, there is a need for attachment to be made, complicating the vehicle manufacturing processes.

SUMMARY OF THE INVENTION

Exemplary embodiments of the present invention are to provide a curtain airbag using a simple configuration to prevent interference from an interior member during deployment and inflation of a curtain bag section.

According to one or more aspects of the present invention, there is provided a curtain airbag. The curtain airbag includes: a curtain bag section configured with cloth panels joined to each other, the curtain bag section being housed in a folded state within a side edge portion of a roof of a vehicle before a deployment gas is injected into the curtain bag section, wherein the curtain bag section deploys and inflates downwards from the roof of the vehicle when the deployment gas is injected into the curtain bag section; a collision detector configured to detect at least one of a collision of the vehicle and signs of an imminent collision of the vehicle; a gas generator configured to supply the deployment gas to the curtain bag section in response to a detection result of the collision detector; and a guide member joined to the curtain bag section and configured with a cloth panel, the guide member being rolled up to cover the curtain bag section that has been folded before deployment and inflation of the curtain bag section, when viewed from a vehicle width direction, wherein the guide member is housed within the side edge portion of the roof together with the curtain bag section before deployment and inflation of the curtain bag section. The curtain bag section deploys and inflates downwards from the roof of the vehicle such that the guide member guides the curtain bag section, when the deployment gas is injected into the curtain bag section. A position of the guide member in a vehicle longitudinal direction is overlapped with a position of an interior member in the vehicle longitudinal direction.

Other aspects and advantages of the present invention will be apparent from the following description, the drawings and the claims.

BRIEF DESCRIPTION OF THE DRAWINGS

Exemplary embodiments of the present invention will be described in detail based on the following figures, wherein:

FIGS. 2A to 2G are schematic cross-sections illustrating a folding method and action during deployment and inflation of the curtain bag section of the first exemplary embodiment;

DETAILED DESCRIPTION

Exemplary embodiments of the invention will be now described with reference to the drawings.

First Exemplary Embodiment

The curtain airbag of a first exemplary embodiment is, for example, installed in an automobile, such as a car. A curtain bag section of the curtain airbag is housed in a folded state inside trim at a section at the side edge of the roof prior to use. When a collision of the vehicle is detected, the curtain bag section deploys and inflates downwards substantially along the side window glass.

Figure 1:
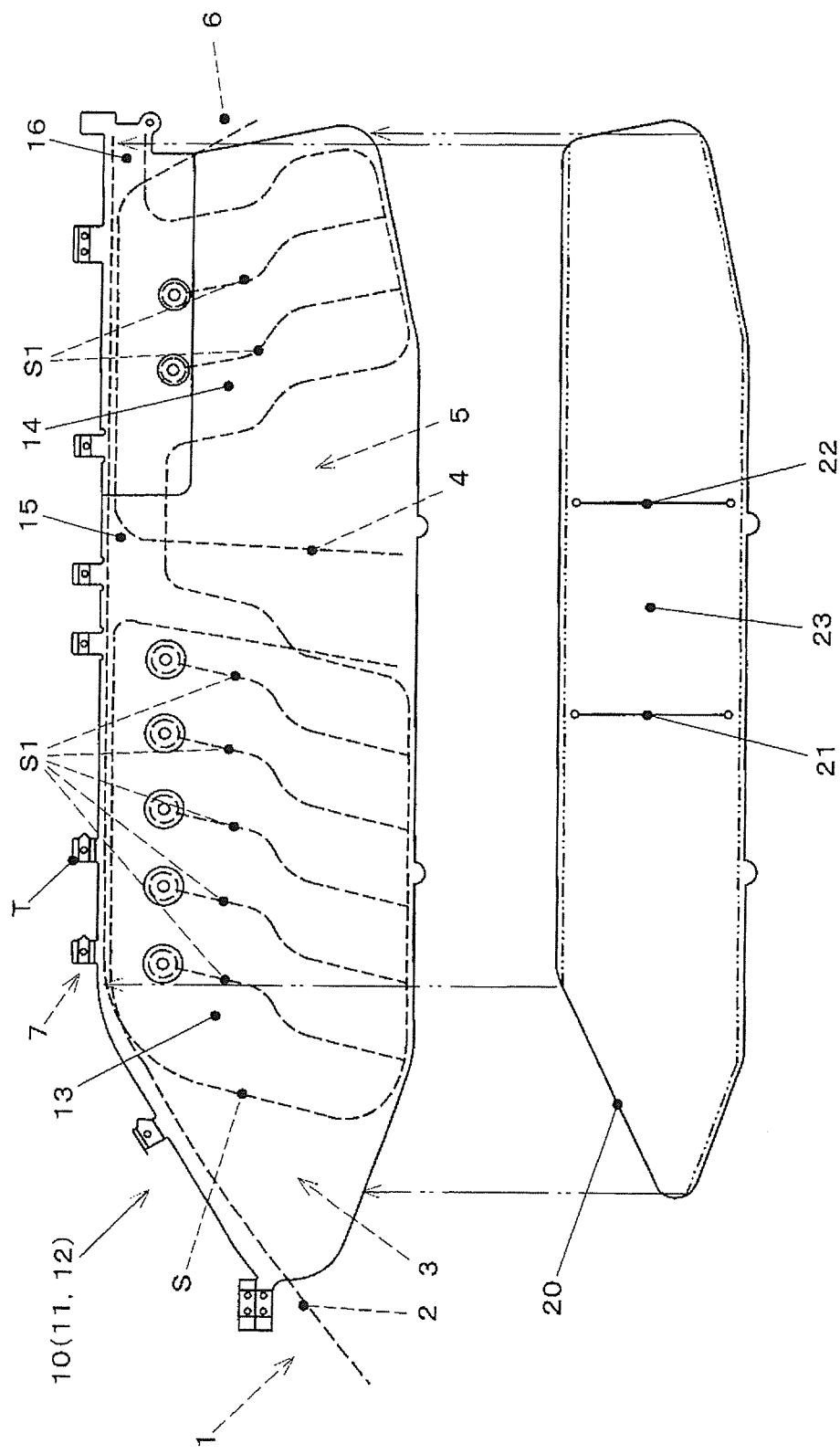
FIG. 1 is an exploded layout of a curtain bag section in a curtain airbag according to a first exemplary embodiment of the invention, showing a state in which a rear tension panel has been removed, wherein pillars of a vehicle are shown by broken lines (this also applies in FIG. 4)

As shown in FIG. 1, a vehicle 1 has an A-pillar 2, a front door glass 3, a B-pillar 4, a rear door glass 5, and a C-pillar 6, disposed in this sequence from the front.

The A-pillar 2 is a pillar shaped section extending along the vehicle left and right edge portions of the front windscreen.

The front door glass 3 is a side window glass installed to the front door so as to be capable of being raised and lowered. The front edge portion of the front door glass 3 is disposed along the rear edge portion of the A-pillar 2.

The B-pillar 4 is a pillar shaped section provided between the rear edge portion of the front door glass 3 and the front edge portion of the B-pillar 4.

A trim 4A, this being a decorative member (pillar trim) formed for example from a resin, is attached at the vehicle compartment inside of the B-pillar 4.

The rear door glass 5 is a side door window glass installed to the rear door so as to be capable of being raised and lowered.

The C-pillar 6 is a pillar shaped section extending along the rear edge portion of the rear door glass 5.

A roof side rail 7 is provided extending in the vehicle front-rear direction spanning between top end portions of each of the pillars. The roof side rail 7 is a vehicle body structural member disposed at a section at each of the side edges of the roof.

The curtain airbag is configured with an inflator, collision detector, inflator controller, these not being shown in the drawings, and a curtain bag section 10 illustrated in FIG. 1.

The inflator is a gas generator for generating inflation gas by means of an explosive, for example, and is mounted to a portion of the C-pillar 6.

The collision detector, for example, is a device provided with plural accelerometers placed at various locations on the vehicle for detecting a vehicle collision.

The inflator controller determines whether or not to deploy and inflate the curtain bag section 10 based on output from the collision detector. The inflator controller outputs a control signal to the inflator when deployment is required, thereby causing the inflator to generate deployment gas.

The curtain bag section 10 is formed in a bag shape by stitching together a front panel 11 and a rear panel 12.

The front panel 11 and the rear panel 12 are made from cloth panel treated with a coating to obtain the desired strength, gas sealing ability and heat resistance.

The front panel 11 and the rear panel 12 are formed in substantially the same shape as each other, and, after deployment is complete, become disposed at the occupant side (vehicle width direction inside) and vehicle outside (vehicle width direction outside), respectively.

The curtain bag section 10 includes a front chamber 13, a rear chamber 14, a communication section 15 and a gas injection inlet 16 made by stitching together the front panel 11 and the rear panel 12 with stitching S.

A sealing agent, not shown in the drawings, is disposed in bands between the front panel 11 and the rear panel 12 at locations stitched together by the stitching S.

The top edge of the curtain bag section 10 is formed with plural tabs T used for fixing the curtain bag section 10 to the vehicle 1.

The front chamber 13 and the rear chamber 14 are sections that restrain the head, shoulders and upper arms of occupant (s) seated in the front and/or rear seats, respectively, when deployed. The front chamber 13 and the rear chamber 14 are formed into bag shapes by stitching together around their peripheries with the stitching S.

The front chamber 13 is disposed in a region overlapping with the vehicle 1 front-rear direction position of the front door glass 3.

The rear chamber 14 is disposed in a region overlapping with the vehicle 1 front-rear direction position of the rear door glass 5.

Stitching S1 is formed at central portions of the front chamber 13 and the rear chamber 14 to restrict the thickness of the curtain bag section 10 when inflated.

The stitching S1 branches off from the stitching S at the bottom edges of the front chamber 13 and the rear chamber 14, and extends out across central portions, with several sets of the stitching S1 provided at intervals along the front-rear direction. The stitching S1 is formed at the top ends with circular shapes, in order to avoid stress concentration, and holes are formed through each of the panels at central portions of these circular shapes.

The communication section 15 communicates the front chamber 13 with the rear chamber 14, and is a communication path capable of supplying deployment gas from the rear chamber 14 side to the front chamber 13 side during deployment.

The communication section 15 is extends substantially horizontally and spans between a rear portion at the top edge of the front chamber 13 and a front portion at the top edge of the rear chamber 14.

The gas injection inlet 16 is provided at a rear portion at the top edge of the rear chamber 14, and is a portion to which the inflator, not shown in the drawings, is connected through an injection tube channel, not shown in the drawings. Deployment gas is injected between the front panel 11 and the rear panel 12 at the gas injection inlet 16.

A rear tension panel 20, explained below, is joined to the curtain bag section 10 of the first exemplary embodiment.

As shown in FIGS. 2A to 2E, the rear tension panel 20 functions to maintain the curtain bag section 10 after deployment and inflation such that when viewed from the vehicle front-rear direction, a central portion of the curtain bag section 10 adopts a curved or bent shape so as to project out to the vehicle compartment inside with respect to the top and bottom edges of the curtain bag section 10. The rear tension panel 20 is provided at the vehicle width direction outside (glass side) with respect to the rear panel 12 of the curtain bag section 10, and the top edge portion and bottom edge portion of the rear tension panel 20 are stitched together to the top edge portion and bottom edge portion of the front panel 11 and the rear panel 12 at the same time as stitching together with the stitching S.

The rear tension panel 20 is formed with a smaller up-down direction dimension than that of the rear panel 12, and the separation between the locations for stitching together at the top and bottom of the rear tension panel 20 is set smaller than the separation between the locations for stitching together at the top and bottom of the rear panel 12 when laid out on a flat surface.

Slits 21, 22 are formed to the rear tension panel 20.

The slits 21, 22 are cuts formed in the up-down direction across substantially the whole height of the rear tension panel 20. The slits 21, 22 are disposed at the front and rear of the B-pillar 4, respectively. Round holes are formed at the top and bottom end portions of the slits 21, 22, disposed adjacent to the top and bottom stitched together locations of the rear tension panel 20, in order to prevent stress concentration.

A guide section 23, for preventing interference to the curtain bag section 10 from the trim 4A during deployment of the curtain bag section 10, is configured by a region of the rear tension panel 20 between the slits 21, 22. The guide section 23 is connected at its top and bottom end portions to other portions of the rear tension panel 20 and to the top and bottom end portions of the curtain bag section 10. Detailed explanation is given later regarding functioning of the guide section 23.

Explanation now follows regarding the method of folding and action during deployment and inflation of the curtain bag section 10 described above.

FIGS. 2A to 2E are schematic cross-sections around the curtain bag section 10 looking along the vehicle front-rear direction in the vicinity of the B-pillar 4 (in the region where the guide section 23 is provided).

FIG. 2A illustrates the curtain bag section 10 in a state prior to folding. In FIG. 2A to FIG. 2D direction that will be at the top when installed to a vehicle is shown at the top in the drawings.

First, as shown in FIG. 2B, a lower portion of the curtain bag section 10 is folded in between the other portions of the curtain bag section 10 and the rear tension panel 20 such that when laid out on a flat surface the curtain bag section 10 is substantially the same height as the rear tension panel 20. Note that for clarity of illustration, from FIG. 2C onwards, the curtain bag section 10 in such a folded state is shown as a single bold line (this also applies to FIGS. 3A to 3F).

Note that while in FIG. 2B the lower portion of the curtain bag section 10 is folded in between the rear tension panel 20, configuration may be made such that a central portion of the curtain bag section 10 is folded between other portions of the curtain bag section 10 and the rear tension panel 20.

Next, as shown in FIG. 2C, the top half portion of the curtain bag section 10 is folded into a serpent shape by folding along plural fold lines, disposed at substantially even intervals and extending substantially horizontally, in sequence alternately in opposite directions.

The lower half portion of the curtain bag section 10 is then wound up in a roll shape via the vehicle width direction inside (the left hand side in the diagram).

When this is being performed, the portion of the guide section 23 of the rear tension panel 20 where the curtain bag section 10 is rolled is rolled in with the curtain bag section 10, however the portion of the guide section 23 where the curtain bag section 10 is in a serpent shape is not folded in therewith.

As a result, a portion of the guide section 23 can be placed in a slack state enabling it to droop down.

Next, as shown in FIG. 2D, the above described slack portion of the guide section 23 is wound around from the lower portion of the curtain bag section 10 when installed in a vehicle, via the vehicle width direction inside, and up over to the side of the upper portion of the curtain bag section 10.

The curtain bag section 10 and the rear tension panel 20 are attached to the roof side rail 7 of the vehicle 1 in this state, as shown in FIG. 2E.

When this is performed, the curtain bag section 10 is, for example, temporarily fixed to maintain the folded state of the curtain bag section 10, by using, for example, tape, thread, or a cover that ruptures during deployment.

Explanation now follows regarding action of the curtain bag section 10 during deployment and inflation.

When a vehicle collision is detected and deployment gas starts to be injected from the inflator into the curtain bag section 10, the temporary fixing ruptures, and first the guide section 23 flops down, as shown in FIG. 2F, and covers the trim 4A of the B-pillar 4.

Then the curtain bag section 10 is guided by the guide section 23 so as to be deployed and inflated while sliding over the guide section 23.

When deployment and inflation of the curtain bag section 10 is complete, as shown in FIG. 2G, due to the height of the rear tension panel 20 being less than the height of the front panel 11 and rear panel 12 of the curtain bag section 10, the curtain bag section 10 is maintained in a curved or bent state such that the height direction central portion of the curtain bag section 10 projects out towards the vehicle width direction inside.

FIGS. 3A to 3G are schematic cross-sections showing folded states of the curtain bag section 10 and the rear tension panel 20 at portions other than at the guide section 23, and variations on folding methods. In FIG. 3A to 3G, the vehicle width direction inside (vehicle compartment inside) is illustrated on the left hand side of the drawings.

Figure 3A:
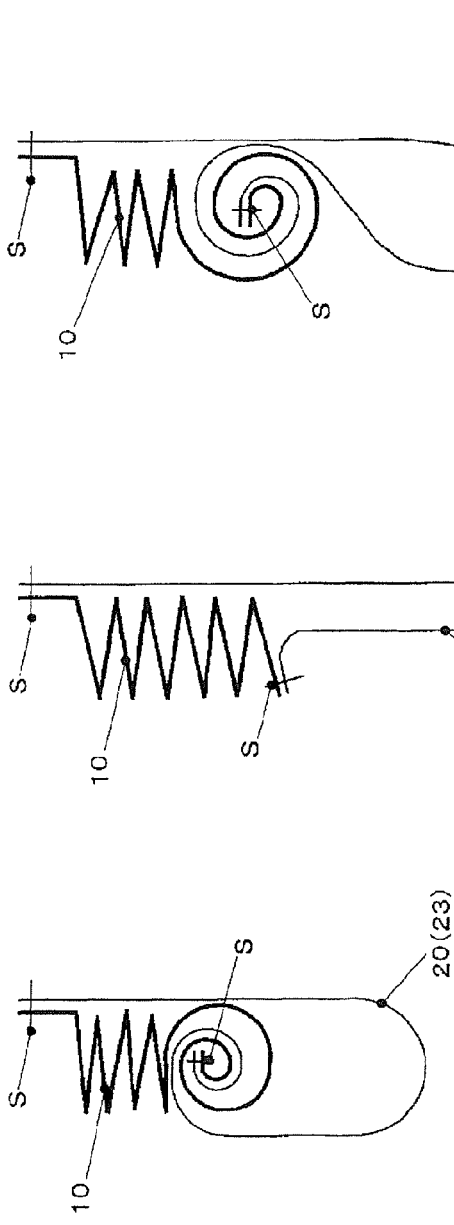
FIGS. 3A to 3F are schematic cross-sections illustrating folding states of a curtain bag section at portions other than at a guide section and examples of other folding methods of the first exemplary embodiment.

FIG. 3A, similar to as explained in FIGS. 2A at 2G, is a diagram showing a folded state where the guide section 23 is provided.

Figure 3B:
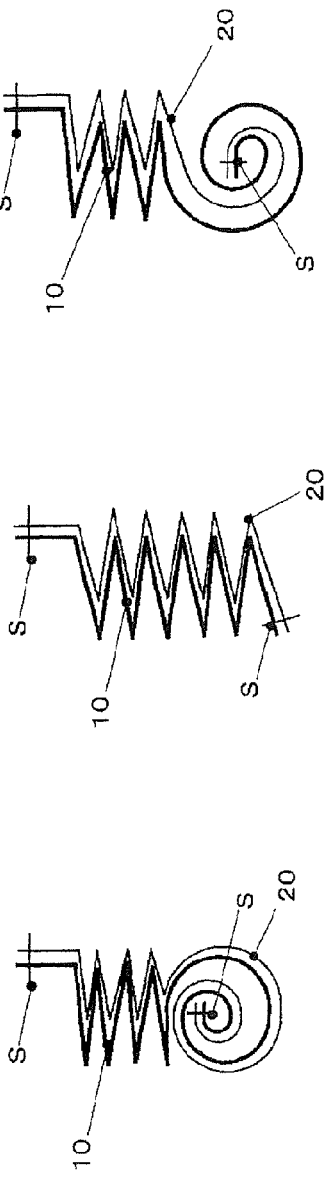

FIG. 3B is a diagram showing a folded state with the folding method used in FIG. 3A at portions other than at the guide section 23.

Figure 3C:
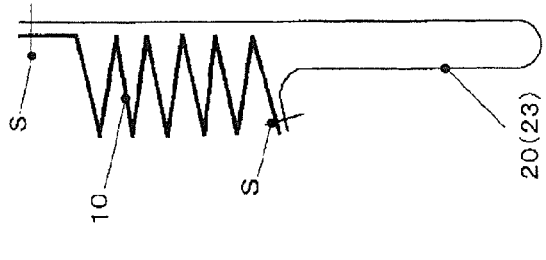

FIG. 3C shows a first modified example of folding state at a portion where the guide section 23 is provided.

Figure 3D:
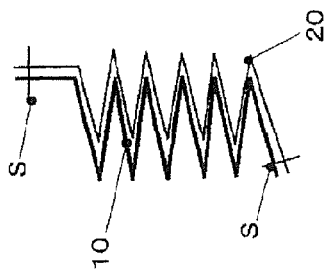

FIG. 3D shows the first modified example of folding state at a portion where the guide section 23 is not provided.

Figure 3E:
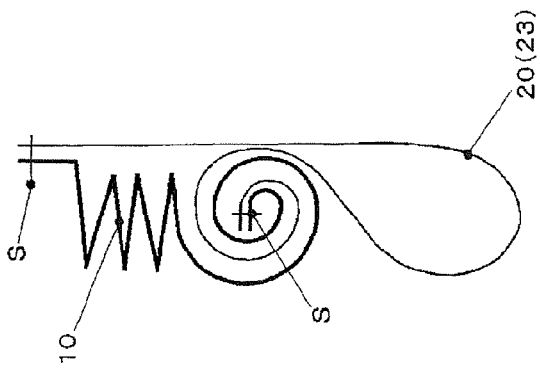

FIG. 3E shows a second modified example of folding state at a portion where the guide section 23 is provided.

Figure 3F:
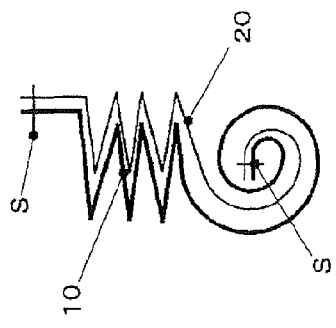
Figure 4:
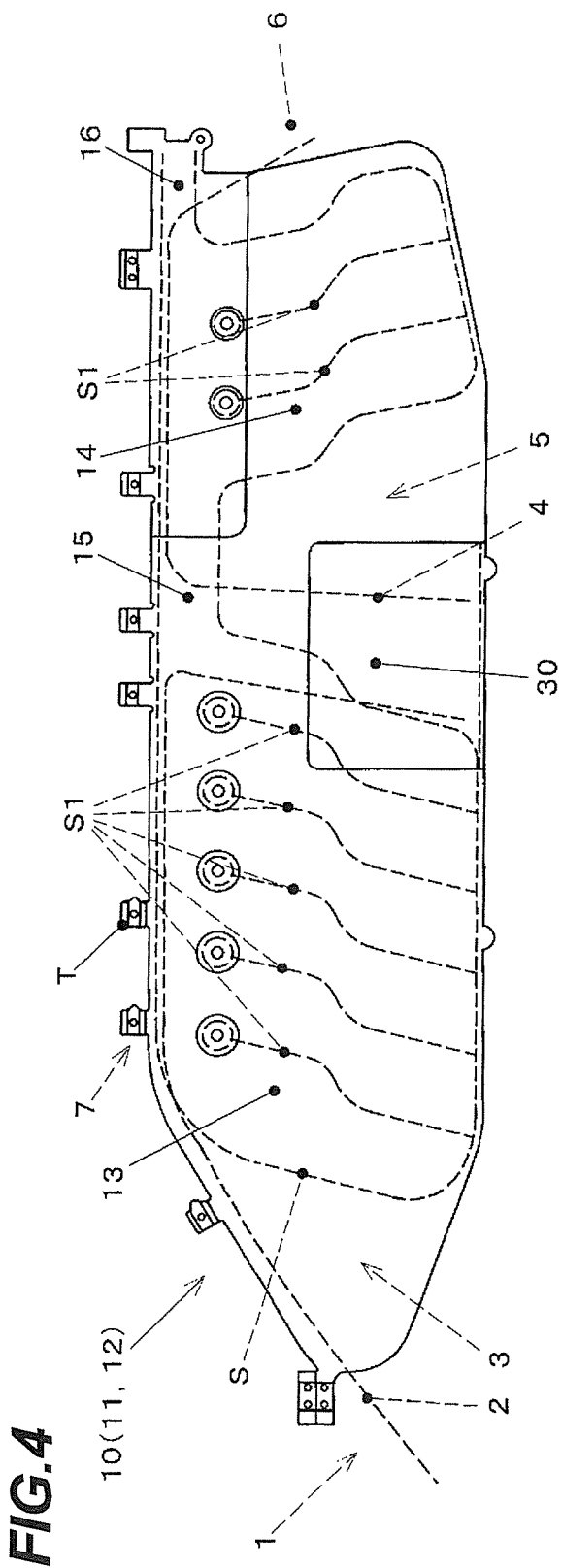
FIG. 4 is a layout of a curtain bag section in a curtain airbag according to a second exemplary embodiment of the invention.

FIG. 3F shows the second modified example of folding state at a portion where the guide section 23 is not provided.

Note that FIG. 3A, FIG. 3C and FIG. 3F show states before rolling up the guide section 23 (slack states of the guide section 23).

In the first modified example, the entire curtain bag section 10 is folded in a serpent shape.

In the second modified example, the upper portion of the curtain bag section 10 is folded in a serpent shape, and the lower portion of the curtain bag section 10 is wound up in a roll in the opposite direction to the first exemplary embodiment, namely towards the vehicle width direction outside.

As shown in FIG. 3B, FIG. 3D and FIG. 3F, portions of the rear tension panel 20 other than at the guide section 23 are folded in their entirety in with the curtain bag section 10, without a slack portion.

According to the first exemplary embodiment and the first and second modified examples as explained above, the following effects can be obtained.

(1) The guide section 23 of the rear tension panel 20 flops down and covers a top portion of the trim 4A of the B-pillar 4 prior to deployment and inflation of the curtain bag section 10. Then, due to the curtain bag section 10 being deployed and inflated while guided by the guide section 23, the curtain bag section 10 can be prevented from, for example, catching on the trim 4A or being inserted inside the trim 4A, such that good deployment control of the curtain bag section 10 can be achieved.

(2) Due to the rear tension panel 20, the curtain bag section 10 is bent to form a projection facing the vehicle inside, namely formed in a so-called D-shape, and consequently stroke in the curtain bag section 10 can be secured during occupant restraint without having to excessively increase the internal volume of the curtain bag section, and the ability to restrain an occupant can be enhanced.

(3) By forming the guide section 23 with the slits 21, 22 cut in a portion of the rear tension panel 20, the above described effect can be achieved without, for example, increasing the number of components, weight, cost or number of assembly processes.

(4) As in the first exemplary embodiment and the second modified example thereof, rapid and certain deployment can be achieved by folding the top portion of the curtain bag section 10 in a serpent shape, and by winding the lower portion of the curtain bag section 10 in a roll shape it becomes possible to control the direction of travel of the bottom edge portion of the curtain bag section 10 at the start deployment, such as with the winding direction and number of winds, enabling even better deployment control to be achieved.

Second Exemplary Embodiment

Explanation now follows regarding a second exemplary embodiment of the invention applied to a curtain airbag.

Note that explanation is primarily regarding points that differ from the first exemplary embodiment and locations substantially common thereto are allocated the same reference numerals and further explanation thereof is omitted.

A curtain airbag of the second exemplary embodiment is provided with a guide panel 30, explained below, in place of the rear tension panel 20 of the first exemplary embodiment.

The guide panel 30 is a cloth panel of substantially rectangular shape provided in a section aligned with the B-pillar 4 and joined to a bottom edge portion of a curtain bag section 10.

The edge of the guide panel 30 on the opposite side to the side joined to the curtain bag section 10 is not joined to any other member and adopts a free state (a state enabling it to flop down).

When the curtain bag section 10 is being folded in the second exemplary embodiment, the guide panel 30 is, similarly to the guide section 23 of the first exemplary embodiment, wound from the bottom side of the curtain bag section 10, via the vehicle width direction inside, up over to the top side of the curtain bag section 10.

The guide panel 30, similarly to the guide section 23 of the first exemplary embodiment, prevents interference to the curtain bag section 10 from the trim 4A of the B-pillar 4 during deployment and inflation of the curtain bag section 10, enabling good deployment and inflation of the curtain bag section 10.

Similar effects can also be obtained by the second exemplary embodiment to the effects of the first exemplary embodiment.

Note that the technical scope of the invention is not limited by each of the exemplary embodiments described above, and appropriate modifications are possible. Examples of such modifications are as follows, with these modifications falling within the technical scope of the invention:

(1) while the curtain bag section is deployed and inflated in response to a vehicle collision in the above exemplary embodiments there is no limitation thereto, and configuration may be made such that the curtain bag section is deployed and inflated in response to output from a known pre-crash detector for detecting signs of an impending collision;

(2) while the guide member is disposed at a location where the trim of the B-pillar is provided in the exemplary embodiments there is no limitation thereto, and configuration may be made such that the guide member is disposed at a location where other internal members that might interfere are provided, such as trim of another pillar, an above door grab handle or a shoulder belt anchor;

(3) while the curtain bag section is configured by stitching together two sheets of cloth panel in the exemplary embodiments the number and combination of cloth panels configuring the curtain bag section are not limited thereto, and the method of joining together is not limited to stitching together, and another method, such as adhesive bonding, may be employed;

(4) while the inflator (gas generator) is connected to a portion on the rear edge of the curtain bag section in the exemplary embodiments there is no limitation to the position where the inflator is connected and, for example, the inflator may be connected to a top portion or front portion of the curtain bag section; and (5) while both the top and bottom of the guide section 23 configuring the rear tension panel 20 in the first exemplary embodiment are connected to the curtain bag section 10, configuration may be made such that either the top edge or the bottom edge of such a guide is free and not connected to the curtain bag section or other sections of the rear tension panel.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A curtain airbag comprising:
   a curtain bag section configured with cloth panels joined to each other, the curtain bag section being housed in a folded state within a side edge portion of a roof of a vehicle before a deployment gas is injected into the curtain bag section, wherein the curtain bag section deploys and inflates downwards from the roof of the vehicle when the deployment gas is injected into the curtain bag section;
   a collision detector configured to detect at least one of a collision of the vehicle and signs of an imminent collision of the vehicle;
   a gas generator configured to supply the deployment gas to the curtain bag section in response to a detection result of the collision detector; and
   a tension panel joined to the curtain bag section and configured with a cloth panel, wherein the curtain bag section when inflated has upper and lower portions, and the tension panel has upper and lower portions when the curtain airbag section is inflated that are connected to the corresponding upper and lower portions of the curtain bag section, the curtain bag section having a height in the up-down direction before inflation that is larger than a corresponding height of the tension panel in the up-down direction, the curtain bag section being folded to reduce the height thereof to generate a lower slack portion of the tension panel that extends below the folded curtain bag section with the lower slack portion of the tension panel being rolled up to extend up from the curtain bag section lower portion to extend over the upper portion thereof to cover the folded curtain bag section that has been folded before deployment and inflation of the curtain bag section, when viewed from a vehicle width direction, wherein the tension panel is housed within the side edge portion of the roof together with the curtain bag section before deployment and inflation of the curtain bag section,
   wherein the curtain bag section deploys and inflates downwards from the roof of the vehicle such that tension panel guides the curtain bag section, when the deployment gas is injected into the curtain bag section,
   wherein a position of the tension panel in a vehicle longitudinal direction is overlapped with a position of an interior member of the vehicle in the vehicle longitudinal direction, and
   wherein the tension panel has a pair of slits spaced from each other in the vehicle longitudinal direction and extending in the up-down direction and a guide section between the slits such that when the curtain bag section is deployed, the tension panel slack portion including the guide section flops down so that the guide section covers the interior member, and upon inflation of the curtain bag section, an intermediate portion of the curtain bag section between the upper and lower portions thereof extends further into the vehicle in the vehicle width direction than do the upper and lower portions of the curtain bag section.

2. The curtain airbag of claim 1, wherein before deployment and inflation of the curtain bag section, the upper portion of the curtain bag section is folded up into concertinas, and the lower portion of the curtain bag section is wound up in a roll shape together with the tension panel.

3. The curtain airbag of claim 1, wherein the interior member is a pillar trim.

* * * * *